(12) United States Patent
Bednarczyk et al.

(10) Patent No.: US 8,560,674 B2
(45) Date of Patent: Oct. 15, 2013

(54) APPARATUS AND METHOD FOR DETECTING KEY WORDS WITHIN DATA FEEDS

(75) Inventors: William Ray Bednarczyk, Carmel, IN (US); Sylvain Pierre Chaillou, Boulogne-Billancourt (FR); Joris Roussel, Paris (FR); Jayanta Majumdar, Irvine, CA (US); Quan Liu, Carmel, IN (US)

(73) Assignee: Thomson Licensing LLC, Boulogne-Billancourt (FR)

( * ) Notice: Subject to any disclaimer, the term of this patent is extended or adjusted under 35 U.S.C. 154(b) by 534 days.

(21) Appl. No.: 12/448,578

(22) PCT Filed: Nov. 28, 2007

(86) PCT No.: PCT/US2007/024475
§ 371 (c)(1),
(2), (4) Date: Jun. 25, 2009

(87) PCT Pub. No.: WO2008/111963
PCT Pub. Date: Sep. 18, 2008

(65) Prior Publication Data
US 2010/0115087 A1    May 6, 2010

Related U.S. Application Data

(60) Provisional application No. 60/878,720, filed on Jan. 5, 2007.

(51) Int. Cl.
*G06F 15/173* (2006.01)
(52) U.S. Cl.
USPC .......................................... 709/224; 709/231

(58) Field of Classification Search
USPC .................................................. 709/224, 231
See application file for complete search history.

(56) References Cited

U.S. PATENT DOCUMENTS

| | | | | |
|---|---|---|---|---|
| 5,861,818 A | * | 1/1999 | Ohtsuki | 340/7.52 |
| 6,944,482 B2 | * | 9/2005 | Engstrom et al. | 455/566 |
| 8,122,087 B2 | * | 2/2012 | Sobotka et al. | 709/206 |
| 2004/0222977 A1 | | 11/2004 | Bear et al. | |
| 2005/0216528 A1 | * | 9/2005 | Cheng | 707/202 |
| 2005/0216837 A1 | * | 9/2005 | Washburn | 715/708 |

(Continued)

FOREIGN PATENT DOCUMENTS

| JP | 2001-333454 | 11/2001 |
|---|---|---|
| JP | 2004-334882 | 11/2004 |

OTHER PUBLICATIONS

"Keyword Focused RSS Alerts Delivered via SMS, IM, or Email: ZapTxt.com", Jul. 27, 2006, Resource Shelf, pp. 1-2.*
International Search Report, dated Oct. 1, 2008.

*Primary Examiner* — Firmin Backer
*Assistant Examiner* — Jonathan Bui
(74) *Attorney, Agent, or Firm* — Robert D. Shedd; Reitseng Lin

(57) ABSTRACT

An apparatus such as a cordless telephone handset is capable of detecting key words within received data feeds. According to an exemplary embodiment, the apparatus includes an input for receiving a data feed, and a controller for determining whether content of the received data feed includes a key word. If the controller determines that the content includes the key word, a signal is generated to notify a user.

15 Claims, 4 Drawing Sheets

(56) References Cited

U.S. PATENT DOCUMENTS

| | | | |
|---|---|---|---|
| 2006/0084394 A1* | 4/2006 | Engstrom et al. | 455/90.1 |
| 2006/0155698 A1 | 7/2006 | Vayssiere | |
| 2006/0173985 A1 | 8/2006 | Moore | |
| 2006/0264204 A1* | 11/2006 | Livingood | 455/412.2 |
| 2006/0282822 A1 | 12/2006 | Weng | |
| 2007/0061487 A1* | 3/2007 | Moore et al. | 709/246 |
| 2007/0130158 A1* | 6/2007 | LaBiche et al. | 707/10 |
| 2007/0220048 A1* | 9/2007 | Ott | 707/104.1 |
| 2007/0265857 A1* | 11/2007 | Shivaji Rao | 705/1 |
| 2007/0299874 A1* | 12/2007 | Neumann et al. | 707/104.1 |
| 2008/0010294 A1* | 1/2008 | Norton et al. | 707/10 |
| 2008/0013697 A1* | 1/2008 | Lemieux | 379/88.17 |
| 2008/0065237 A1* | 3/2008 | Long | 700/3 |
| 2008/0162275 A1* | 7/2008 | Logan et al. | 705/12 |
| 2009/0045951 A1* | 2/2009 | Rajan et al. | 340/540 |
| 2010/0257268 A1* | 10/2010 | Landry et al. | 709/225 |
| 2010/0262664 A1* | 10/2010 | Brown et al. | 709/206 |

* cited by examiner

APPARATUS AND METHOD FOR DETECTING KEY WORDS WITHIN DATA FEEDS

CROSS REFERENCE TO RELATED APPLICATION

This application is a National Stage Application and claims the benefit, under 35 U.S.C. §365 of International Application PCT/US2007/024475 filed Nov. 28, 2007, which was published in accordance with PCT Article 21(2) on Sep. 18, 2008 in English, and which claims the benefit of U.S. Provisional Patent Application No. 60/878,720 filed on Jan. 5, 2007.

BACKGROUND OF THE INVENTION

1. Field of the Invention

The present invention generally relates to apparatuses capable of receiving data feeds, and more particularly, to an apparatus and method for detecting key words within received data feeds. Such key words may for example relate to emergency content information, software upgrade information and/or other relevant information.

2. Background Information

Certain devices and apparatuses having access to networks such as the internet may be capable of receiving data feeds. One type of data feed is known as a Real Simple Syndication (RSS) data feed. In general, RSS represents a family of web feed formats that may be used to publish frequently updated content such as news headlines, podcasts and blog entries. An RSS data feed (also known as an RSS document) may contain a summary of content from an associated web site or a full text version of the content. Such data feeds have become increasingly popular with devices coupled to the internet.

Currently, certain RSS feeds do not provide readily available methods/properties for alerting users of certain information such as emergency content information. The present invention described herein addresses this and/or other problems and provides an apparatus and method capable of, among other things, detecting key words within received data feeds.

SUMMARY OF THE INVENTION

In accordance with an aspect of the present invention, an apparatus is disclosed. According to an exemplary embodiment, the apparatus comprises means such as an input for receiving a data feed, and means such a controller for determining whether content of said received data feed includes a key word. If the controller determines that the content includes the key word, the controller generates a signal to notify a user.

In accordance with another aspect of the present invention, a method is disclosed. According to an exemplary embodiment, the method comprises receiving a data feed, determining whether content of the received data feed includes a key word, and generating a signal to notify a user if the content includes the key word.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

DESCRIPTION OF THE PREFERRED EMBODIMENTS

Figure 1:
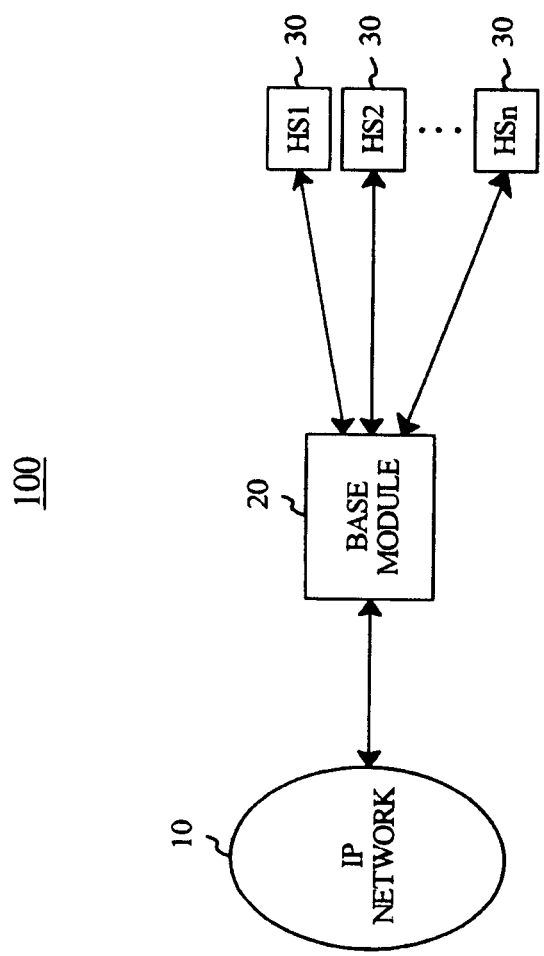
FIG. 1 is a block diagram of a system suitable for implementing the present invention.

Referring now to the drawings, and more particularly to FIG. 1, a block diagram of a system 100 suitable for implementing the present invention is shown. As indicated in FIG. 1, system 100 comprises an internet protocol (IP) network 10, a base module 20, and one or more telephone handsets 30 (shown as HS1-HSn, where "n" is any integer. For purposes of example and explanation, system 100 is shown as a cordless telephone system coupled to the internet. However, it will be intuitive to those skilled in the art that the principles of the present invention may also be applied to other types of systems, including any system capable of receiving data feeds such as RSS data feeds. Accordingly, system 100 of FIG. 1 is only exemplary, and is not intended to limit the present invention in any manner.

In exemplary system 100 of FIG. 1, base module 20 is operatively coupled to IP network 10. Base module 20 represents a base station of a cordless telephone system having wireless communication with one or more associated handsets 30. According to an exemplary embodiment, base module 20 and/or telephone handsets 30 are capable of detecting key words within received data feeds, such as RSS data feeds. Such key words may for example relate to emergency content information, software upgrade information and/or other relevant information. Upon detection of one or more key words, a user is notified via an output provided via one or more of the telephone handsets 30.

Figure 2:
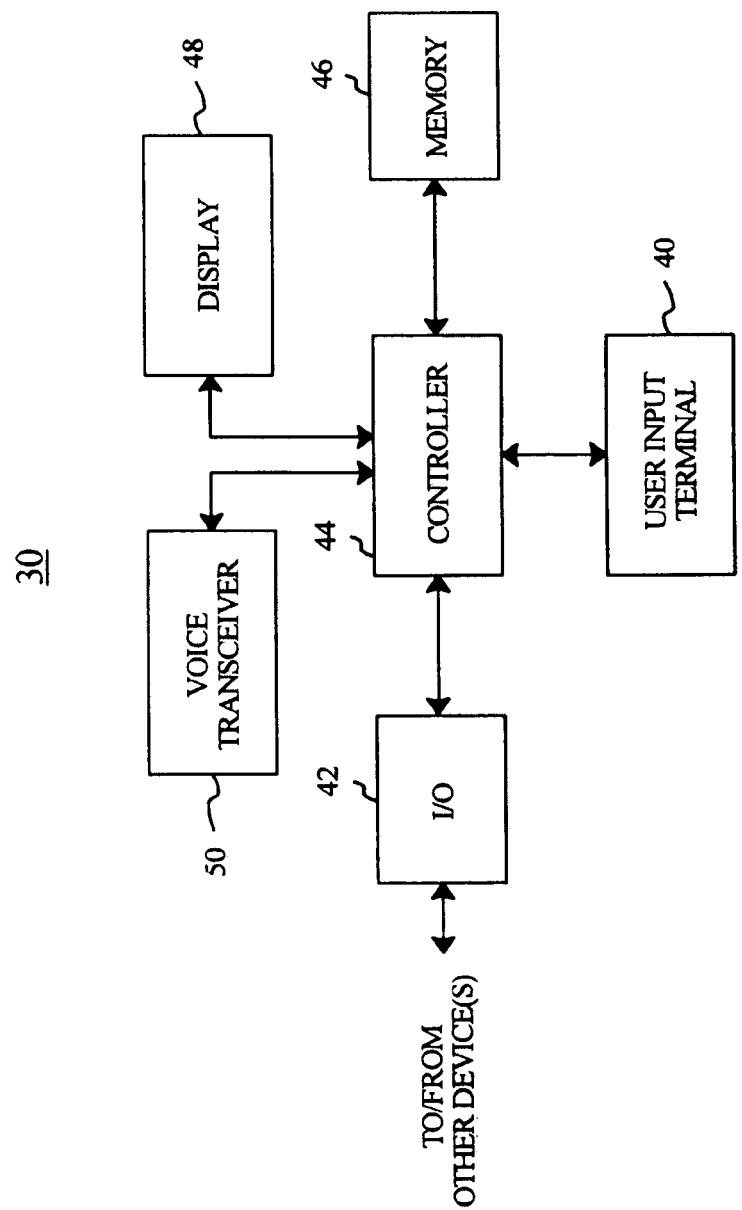
FIG. 2 is a block diagram of a relevant portion of one of the telephone handsets shown in FIG. 1 according to an exemplary embodiment of the present invention.

Referring now to FIG. 2, a block diagram of a relevant portion of one of the telephone handsets 30 shown in FIG. 1 according to an exemplary embodiment of the present invention is shown. As indicated in FIG. 2, telephone handset 30 comprises user input means such as user input terminal 40, input/output (I/O) means such as I/O block 42, control means such as controller 44, data storage means such as memory 46, visual I/O means such as display 48, and aural I/O means such as voice transceiver 40. Some of the foregoing elements of telephone handset 30 may be implemented using one or more integrated circuits (ICs). Moreover, some of the foregoing elements of telephone handset 30, such as controller 44 and memory 46, may be included in base module 20, as opposed to telephone handset 30 as represented in FIG. 2. For clarity of description, certain conventional elements associated with telephone handset 30 such as certain control signals, power signals, aural output means (e.g., for providing ring tones, aural alert outputs, etc.) and/or other elements may not be shown in FIG. 2. According to an exemplary embodiment, telephone handset 30 may not include a web browser.

User input terminal 40 is operative to receive inputs from users, and to output signals corresponding to the user inputs to controller 44. According to an exemplary embodiment, user input terminal 40 may be implemented as a keypad having a plurality of keys that enable numeric and alphabetic input capabilities. User input terminal 40 may also include voice input capabilities. User input terminal 40 may for example be illuminated when in use (e.g., via light emitting diodes (LEDs) and/or other illumination means).

I/O block 42 is operative to perform I/O functions of telephone handset 30. According to an exemplary embodiment, I/O block 42 is operative to transmit signals to and receive signals from other devices, systems and/or apparatuses including base module 20. I/O block 42 may include one or more antenna elements, plugs, and/or other types of I/O elements.

Controller 44 is operative to perform various signal processing and control functions of telephone handset 30. According to an exemplary embodiment, controller 44 is operative to execute software code that enables the detection of key words within received data feeds. According to this exemplary embodiment, controller 44 examines the content of received data feeds and enables one or more alert outputs if a key word is detected within the received data feeds. Further details regarding the foregoing feature of the present invention will be provided later herein.

Controller 44 is also operative to perform and/or enable functions of telephone handset 30 including detecting and processing user inputs made via user input terminal 40, enabling the input and output of data via I/O terminal 42, reading and writing data from and to memory 46, enabling displays of user interfaces/menus via display 48, and/or other functions. Although FIG. 2 shows controller 44 as being part of telephone handset 30, it may alternatively be located in base module 20 and/or a portion of its functionality may be employed via a controller/processor (not shown) included in base module 20.

Memory 46 is operative to perform data storage functions of telephone handset 30. According to an exemplary embodiment, memory 46 stores data including executable software code, on-screen display data, user setup data, telephone numbers, and/or other data. Although FIG. 2 shows memory 46 as being part of telephone handset 30, it may alternatively be located in base module 20, or a portion thereof may be included within base module 20.

Display 48 is operative to provide visual displays under the control of controller 44. According to an exemplary embodiment, display 48 provides visual displays of on-screen menus that facilitate a set up process for telephone handset 30, which will be described later herein. Display 48 is also operative to provide visual displays of alert outputs which notify a user regarding emergency content information, software upgrade information and/or other relevant information. Display 48 may also be implemented as a touch-screen. In such a case, display 48 may include touch icons that correspond to one or more keys of user input terminal 40. Voice transceiver 50 is operative to transmit and receive voice data to and from controller 44 during telephone calls.

Figure 3:
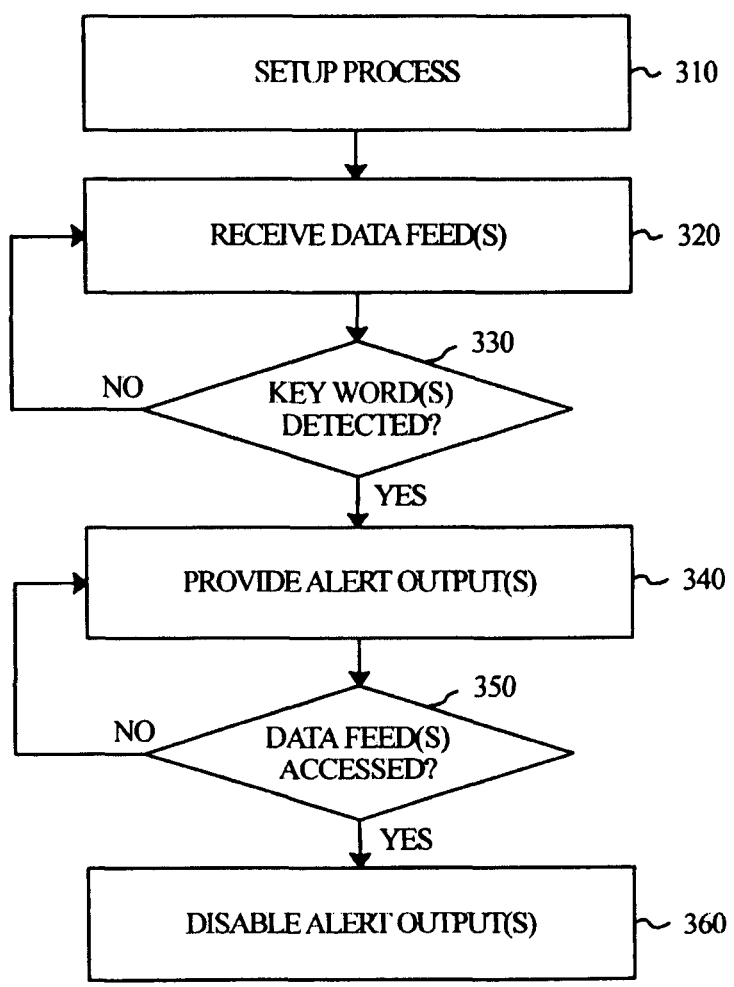
FIG. 3 is a flowchart illustrating steps according to an exemplary embodiment of the present invention.

Referring now to FIG. 3, a flowchart 300 illustrating steps according to an exemplary embodiment of the present invention is shown. For purposes of example and explanation, the steps of FIG. 3 will be described with reference to the elements of exemplary system 100 shown in FIG. 1. The steps of FIG. 3 are only exemplary, and are not intended to limit the present invention in any manner.

At step 310, a setup process is performed. According to an exemplary embodiment, a user performs the set up process at step 310 using one of the telephone handsets 30. In particular, the user may perform the setup process at step 310 by providing inputs via user input terminal 40 responsive to one or more on-screen menus provided via display 48 under the control of controller 44. According to this exemplary embodiment, the setup process of step 310 may include three types of selections: (i) one or more geographical areas of interest, (ii) one or more key words, and (iii) one or more data feeds to be received and examined for the inclusion of one or more key words.

With respect to selection (i), the user may select one or more geographical areas of interest for which he/she wants to be notified in the event of applicable newsworthy events (e.g., weather alerts, terror alerts, etc.). The selected geographical areas may be represented by cities, towns, states and/or any other type of definable geographical areas. These selected geographical areas become key words that are searched for within received data feeds. For example, if the user selects the city of Carmel, Ind., the terms "Carmel" and "Indiana" become key words that are searched for within received data feeds. Similarly, the user may also employ the Boolean operator OR at selection (i) to thereby search for either "Carmel" or "Indiana" within received data feeds.

With respect to selection (ii), the user may select one or more key words which he/she wants to be searched for within the received data feed(s). These terms may be searched for in addition to, or separately from, the selected geographical areas. In this manner, the user may define sets of specified search criteria using, for example, Boolean operators. For example, if the user selects the city of "Carmel, Indiana" as a geographical area of interest under selection (i), and couples this selection with the key word "warning" under selection (ii) using the Boolean operator AND, the user will be notified if a data feed containing the terms "Carmel", "Indiana" and "warning" is received. This example may be useful for notifying the user regarding weather-related and/or other types of warnings applicable to Carmel, Ind. As another example, if the user selects the city of "Boston" as a geographical area of interest under selection (i), and couples this selection with the key word "baseball" under selection (ii) using the Boolean operator AND, the user will be notified if a data feed containing the terms "Boston" and "baseball" is received. This example may be useful for notifying the user regarding news related to the Boston Red Sox. Of course, other types of search criteria using, for example, any Boolean operators (e.g., AND, OR, NOT, etc.) may also be created according to principles of the present invention. Moreover, the user may also elect not to make a selection under either (i) or (ii). For example, the user may select only a geographical area of interest under selection (i), but not select another key word under selection (ii). Conversely, the user may select only one or more key words under selection (ii), but not select a geographical area of interest under selection (i).

With respect to selection (iii), the user may also select the one or more data feeds which he/she wants to receive and be examined for the inclusion of one or more key words specified under selections (i) and (ii). For example, the user may select one or more RSS data feeds of interest. According to an exemplary embodiment, under selection (iii) the user may specify that certain key words specified under selections (i) and (ii) are searched for only within certain designated data feeds. For example, with the above-referenced example in which the user selects the city of "Carmel, Indiana" under selection (i), and couples this selection with the key word "warning" under selection (ii) using the Boolean operator AND, the user may further specify under selection (iii) that the terms "Carmel", "Indiana" and "warning" are searched for only within certain data feeds (e.g., weather-related feeds, feeds related to the State of Indiana, etc.). This ability to specify only certain data feeds for searching under selection (iii) may advantageously conserve processing power by reducing the number of data feeds that need to be searched for particular key words. Variations of the setup process of step 310 described above may also be implemented in accordance with the principles of the present invention.

Data corresponding to the user selections made during the setup process of step 310 is stored in memory 46 under the control of controller 44. As previously indicated herein, memory 46 may be located in base module 20 and/or telephone handset 30. Data corresponding to any of the aforementioned user selections may also be pre-programmed into memory 46 at the time of manufacture and/or downloaded into memory from a remote server (not shown in FIGS.) at any time thereafter. In this manner, all or part of the setup process of step 310 described above may not even have to be performed by a user and/or the setup data stored in memory 46 may be periodically updated by a third-party (e.g., a service provider). Also, the setup process of step 310 may be performed separately for each individual telephone handset 30. In this manner, each individual telephone handset 30 may be programmed in a different manner.

At step 320, the one or more data feeds selected by the user at step 310 (i.e., selection (iii)), or otherwise programmed into memory 46 (e.g., via a download update), are received. According to an exemplary embodiment, the one or more data feeds are first received by base module 20 from IP network 10, and are forwarded to one or more telephone handsets 30. Once received by the one or more handsets 30, a visual indication may be provided via display 48 to indicate to the user that the received data feeds may be accessed. According to an exemplary embodiment, at least one of the one or more data feeds received at step 320 includes only text.

At step 330, a determination is made as to whether one or more key words are detected within the received data feed(s). According to an exemplary embodiment, controller 44 is programmed to compare the content of each received data feed with one or more key words stored in memory 46 to thereby determine whether one or more key words are detected within the received data feed(s). As previously indicated above, the user may specify under selection (iii) of step 310 that certain key words specified under selections (i) and (ii) are searched for only within certain designated data feeds, and thereby preserve processing power at step 330.

Figure 4:
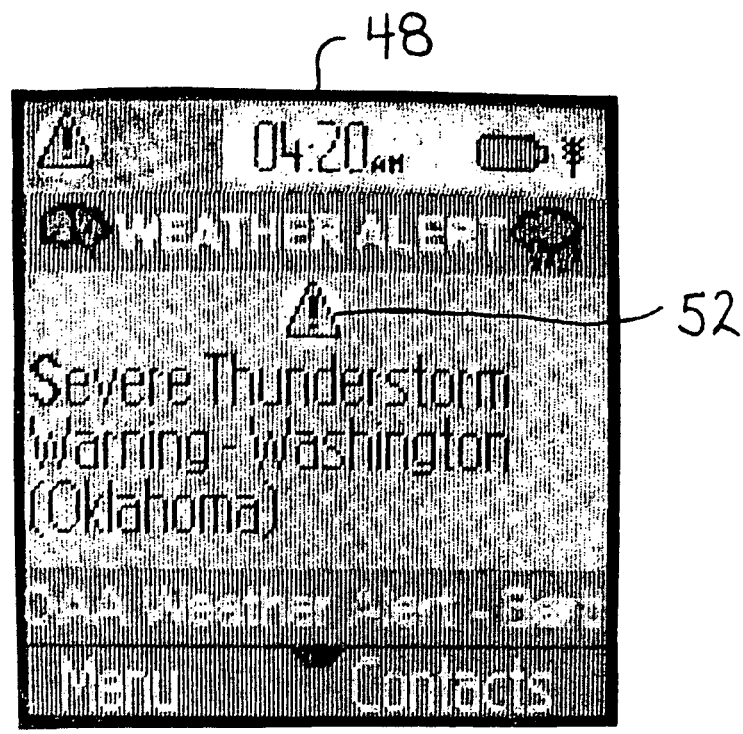
FIG. 4 is an on-screen display illustrating an alert output according to an exemplary embodiment of the present invention.

If the determination at step 330, is negative, process flow loops back to step 320 where base module 20 and the one or more telephone handsets 30 continue to receive the data feed(s) in the aforementioned manner. Alternatively, if the determination at step 330 is positive, process flow advances to step 340 where telephone handset 30 provides one or more alert outputs to notify the user. According to an exemplary embodiment, controller 44 outputs one or more control signals to enable the alert output(s) at step 340, which may be aural and/or visual in nature. FIG. 4 is an exemplary on-screen display illustrating an alert output which may be provided via display 48 at step 340 to notify the user regarding a weather alert. As indicated in is FIG. 4, a visual indicator 52 may be provided via display 48 to attract the user's attention. Visual indicator 52 may for example flash and/or be displayed in any type of predetermined manner in order to attract the user's attention. It is noted that from the user's perspective, steps 320 to 340 may appear to be performed nearly simultaneously.

From step 340, process flow advances to step 350 where a determination is made by controller 44 as to whether the received data feed(s) containing the key word(s) is accessed by the user. According to an exemplary embodiment, the user may access a received data feed by providing one or more inputs to telephone handset 30 via user input terminal 40 which are detected by controller 44. By accessing a data feed containing identified key word(s), the content of the accessed data feed is made available via display 48 under the control of controller 44, and thereby enables the user to learn more information regarding the situation/event/story in question. Notwithstanding the process flow shown in FIG. 3, it is noted that the step of receiving one or more data feeds at step 320 may continue to be performed while steps 330 to 350 are performed.

If the determination at step 350, is negative, process flow loops back to step 340 where telephone handset 30 continues to provide one or more alert outputs in the aforementioned manner. Alternatively, if the determination at step 350 is positive, process flow advances to step 360 where telephone handset 30 disables the one or more alert outputs. According to an exemplary embodiment, controller 44 outputs one or more control signals which disable the one or more alert outputs at step 360. Of course, if more than one data feed is determined to include a key word at step 330, the one or more alert outputs may continue at step 340 until the user has accessed each particular data feed in question. According to another exemplary embodiment, the alert output(s) may also be disabled at step 360 if a previously detected key word is no longer detected within an update of a received data feed. For example, if the key word "alert" is no longer detected within an update of a received weather-related data feed, the alert output(s) is related to this data feed may be disabled since the "alert" state is presumed to no longer be applicable.

As described herein, the present invention provides an apparatus and method for detecting key words within received data feeds. While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. An apparatus, comprising:
an input for receiving a plurality of data feeds; and
a controller for detecting any of said data feeds having a key word selected by a user contained therein and activating a single visual indicator of said apparatus in response to at least one of said data feeds being detected to have said key word, wherein:
said single visual indicator is displayed independently from text of said received data feeds; and
said controller continues to activate said single visual indicator until said user has accessed all of said received data feeds detected to have said key word and inactivates said single visual indicator before said user has accessed all of said received data feeds detected to have said key word when said key word is no longer contained in any updates of said received data feeds.

2. The apparatus of claim 1, wherein said single visual indicator flashes when activated.

3. The apparatus of claim 1, wherein said received data feeds are selected by said user from among a second plurality of data feeds.

4. The apparatus of claim 1, wherein said single visual indicator comprises an on-screen icon.

5. The apparatus of claim 1, wherein at least one of:
one or more of said received data feeds includes only text;

one or more of said received data feeds is a Real Simple Syndication (RSS) data feed;
said apparatus does not include a web browser; and
said apparatus includes at least one of a base module and a telephone handset.

6. A method, comprising:
receiving, via an apparatus, a plurality of data feeds;
detecting any of said data feeds having a key word selected by a user contained therein;
activating a single visual indicator of said apparatus in response to receipt of at least one of said data feeds being detected to have said key word, wherein:
said single visual indicator is displayed independently from text of said received data feeds;
said single visual indicator continues to be activated until said user has accessed all of said received data feeds being detected to have said key word; and
said single visual indicator is inactivated before said user has accessed all of said received data feeds being detected to have said key word when said key word is no longer contained in any updates of said received data feeds.

7. The method of claim 6, wherein said single visual indicator flashes when activated.

8. The method of claim 6, wherein said received data feeds are selected by said user from among a second plurality of data feeds.

9. The method of claim 6, wherein said single visual indicator comprises an on-screen icon.

10. The method of claim 6, wherein at least one of:
one or more of said received data feeds includes only text;
one or more of said received data feeds is a Real Simple Syndication (RSS) data feed;
said apparatus does not include a web browser; and
said apparatus includes at least one of a base module and a telephone handset.

11. An apparatus, comprising:
means for receiving a plurality of data feeds;
means for detecting any of said data feeds having a key word selected by a user contained therein; and
means for activating a single visual indicator of said apparatus in response to at least one of said data feeds being detected to have said key word, wherein:
said single visual indicator is displayed independently from text of said received data feeds;
said activating means continues to activate said single visual indicator until said user has accessed all of said received data feeds being detected to have said key word; and
said activating means inactivates said single visual indicator before said user has accessed all of said received data feeds being detected to have said key word when said key word is no longer contained in any updates of said received data feeds.

12. The apparatus of claim 11, wherein said single visual indicator flashes when activated.

13. The apparatus of claim 11, wherein said activating means also detects said key word in said received data feeds.

14. The apparatus of claim 11, wherein said received data feeds are selected by said user from among a second plurality of data feeds.

15. The apparatus of claim 11, wherein at least one of:
one or more of said received data feeds includes only text;
one or more of said received data feeds is a Real Simple Syndication (RSS) data feed;
said apparatus does not include a web browser; and
said apparatus includes at least one of a base module and a telephone handset.

* * * * *